UNITED STATES PATENT OFFICE.

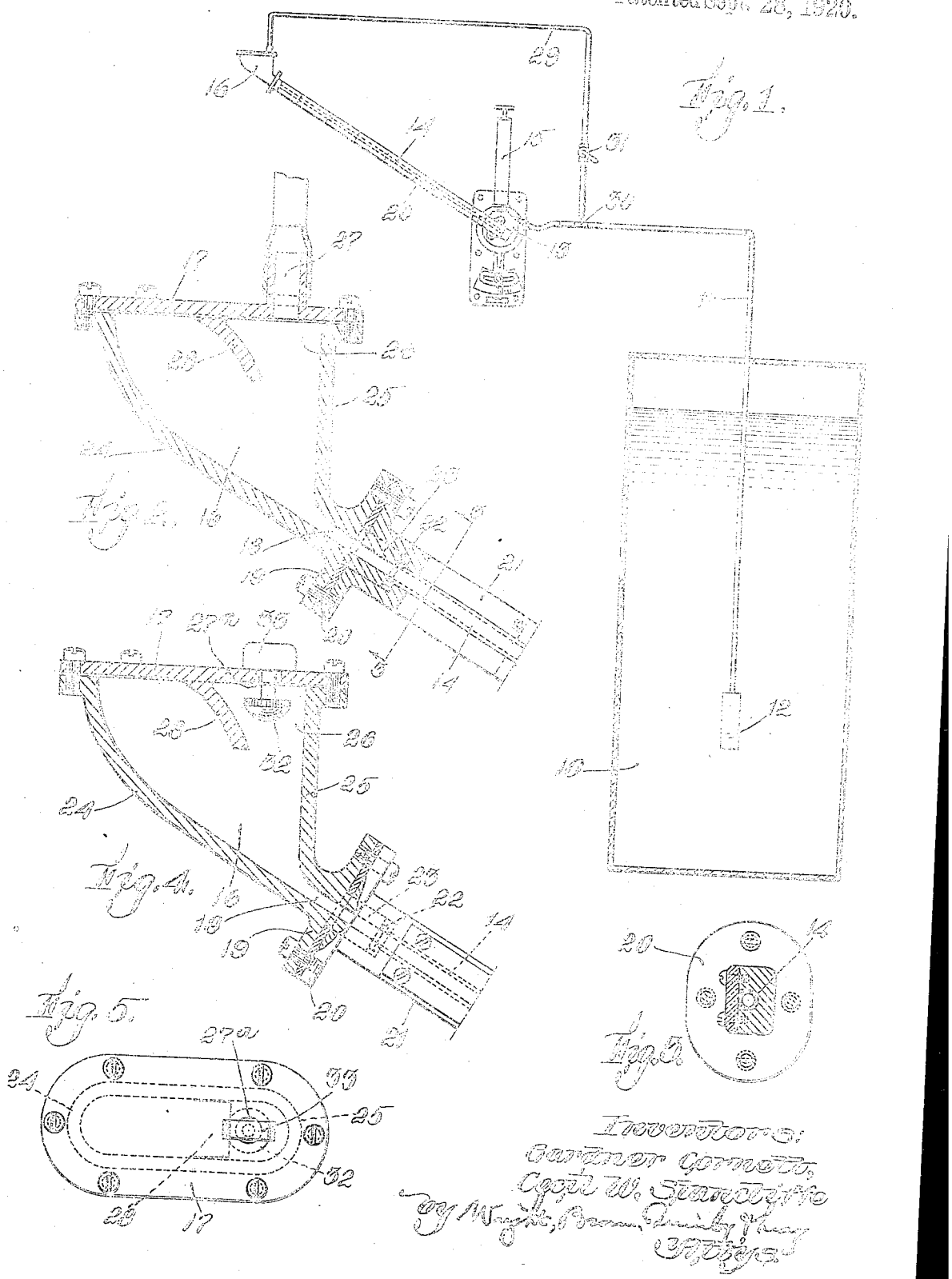

GARDNER CORNETT, OF BRONXVILLE, NEW YORK, AND CECIL W. STANCLIFFE, OF TORONTO, ONTARIO, CANADA, ASSIGNORS TO PNEUMERCATOR COMPANY, OF NEW YORK, N. Y., A CORPORATION OF MAINE.

TRAP FOR MANOMETER-TUBES.

1,354,023.     Specification of Letters Patent.     Patented Sept. 28, 1920.

Application filed June 7, 1919. Serial No. 302,578.

*To all whom it may concern:*

Be it known that we, GARDNER CORNETT, a citizen of the United States, residing at Bronxville, in the county of Westchester and State of New York, and CECIL W. STANCLIFFE, a subject of the King of Great Britain, residing at Toronto, in the Province of Ontario, Canada, have invented new and useful Improvements in Traps for Manometer-Tubes, of which the following is a specification.

The present invention has reference to a trap adapted to be used in connection with an open manometer tube and to serve when thus used to prevent loss of the indicating liquid in the event of such liquid being expelled from the top of the tube by excessive pneumatic pressure. In the use of manometers of the open tube type to measure pneumatic pressures, it frequently happens either from carelessness or unavoidable accident, that the pneumatic pressure is caused or permitted to mount to such a degree that the indicating fluid rises to the top of the tube and overflows; resulting both in loss of the fluid and in more or less seriously impairing the accuracy of the manometer as a pressure indicator until the loss has been made good by replacement of an exactly equal amount of the liquid. When the indicating liquid is expensive, frequent losses from this cause may become an appreciable item of expense; while if the reserve supply of the liquid is reduced, it may well happen that the indicator is put out of action until the supply is replenished, and this may well be a serious or intolerable condition.

It is our purpose to provide a trap which when used with a manometer tube will wholly prevent this loss of the indicating liquid, and one also which will be vented to permit escape of the excess pneumatic pressure in conditions where the entire volume of the liquid is blown from the tube, and will permit return of the liquid into the tube when normal pressure conditions have been restored. A further object is to combine such a trap with a pneumatic depth measuring apparatus in order to permit an excessive pneumatic pressure to be applied in such an apparatus when necessary without causing loss of the indicating liquid.

The indicating fluid usually used in manometer tubes of the type to which our invention is applied is mercury, and in the following specification the invention will be described as applied to an indicator in which that specific liquid is used. But this description is not intended to be construed as limiting the scope of protection which we claim in any way, and the term "mercury" is intended to typify and include any and all fluids which may be used in such tubes.

We have shown in the annexed drawings a typical embodiment of the invention, together with a specific use thereof in connection with an apparatus designed to measure and indicate the depth of a point below the surface of a liquid; such illustration being for convenience in explaining the principles of the invention and not with intent to limit our protection to the specific combination or use shown, or to exclude any of the combinations or uses in and for which the invention may be applied.

In the drawings Figure 1 is a diagrammatic elevation of a pneumatic depth indicating apparatus including an inclined manometer or indicating tube with our trap device and pressure equalizing connections applied thereto. Fig. 2 is a sectional view enlarged of the trap shown in Fig. 1 applied to a manometer tube. Fig. 3 is a sectional elevation on line 3—3 of Fig. 2. Fig. 4 is a similar view showing a modification which consists in the provision of a check valve for the vent. Fig. 5 is a plan view of the top or cover of the device shown in Fig. 4.

The same reference characters indicate the same parts in all the figures.

Describing first the combined apparatus shown in Fig. 1, 10 designates a tank containing liquid of which it may be necessary to ascertain the depth with relation either to the bottom of the tank or to some other fixed level; and the body of liquid in the tank may be considered typical of any liquid body wherein the depth of a point below its surface, or the height of its surface above a given level may need to be known. One large use of the pneumatic depth indicator which we are about to describe is for determining the depth of fuel oil in tanks, wherefore we may consider for the purposes of this description that the tank contains fuel oil. 11 represents a pipe line which enters the tank and terminates in an orifice 12 submerged in the liquid. This orifice is the reference level from which the depth of the liquid is to be known, and for the purpose of measuring the depth of liquid in tanks, it is placed at a known height above the bottom of the tank. The pipe line is connected with a chamber 13 to which there is also connected a manometer or indicator tube 14. Chamber 13 contains an indicating liquid which may be mercury, the volume of which is sufficient to bring its surface above the point of communication with the manometer tube, whereby it may enter and rise in said tube when urged by pneumatic pressure, while such surface is below the connection with the pipe line whereby pneumatic pressure existing in said line is adapted to act upon said surface. 15 represents conventionally an air pump operable manually, and is intended to typify any means for supplying air or any other gas under pressure to the pipe line 11 and chamber 13 for the purpose of clearing the pipe line of liquid down to the level of the orifice 12 and thereby creating a pneumatic pressure equal to the pressure head of the liquid above said orifice in the tank.

Pressure being developed by the means typified by the pump 15 forces downward any of the liquid which may have risen in the pipe line 11, out through the orifice 12 until all is expelled down to the level of such orifice, when the air under excess pressure passes through the orifice and bubbles to the surface of the liquid, thence escaping from the tank through the vents customarily provided. The pneumatic pressure in the pipe line thus becomes equal to the pressure head of the liquid above the orifice, and this pressure acting upon the mercury in the chamber 13 causes a column of mercury to rise in the manometer tube to a height at which it balances the pressure. The tube is here shown as inclined in order that the mercury column may be longer and the travel of its head under differences of pneumatic pressure may be greater than would be the case if the column were upright, in order that slight differences of level may be readily and accurately shown by a liquid of high specific gravity such as mercury. The manometer may likewise be adjusted about a horizontal axis to conform the readings of its scale to liquids of different specific gravities without need of calibrating or applying corrections. The manometer may be, however, placed upright without departing from the essential principles of the invention which we claim herein.

At the upper end of the tube there is arranged a mercury trap 16, the preferred form and construction of which is substantially as shown in Figs. 2, 4, and 5. It comprises side walls preferably convergent from top to bottom, and a top wall 17. At the bottom of the trap, the point of convergence of the side walls, there is an inlet passage 18 surrounded by an attaching flange 19, and the latter is secured by suitable means to a flange 20 on the scale arm or other member 21 which supports and guards the manometer tube 14, whereby the inlet is placed in registering alinement with the bore of the tube, and a leakage tight joint is made by a washer 22 which is interposed between the ends of the tube and a nipple 23 on the trap which contains a part of the inlet passage. Preferably the said inlet is at the lowest point of the trap and the side walls extend to the outlet without forming ledges or pockets in which mercury can collect, but this is a detail which may be departed from, provided only that the inlet is at such a low point in the trap as to permit return of mercury from the trap into the manometer tube.

One of the side walls, namely 24, of the trap is extended in substantial alinement or continuation with the bore of the manometer tube, and its upper part is curved toward the top wall. This side wall thus guides the stream of mercury when it is forced from the tube by excessive pressure, and deflects the stream toward the top wall, where it is checked and caused to drop back. The opposite side wall 25 makes a wide angle with the wall 24, and in conjunction with the top wall provides a pocket 26 at a considerable distance to one side of the ejected stream of mercury, from which a vent 27 passes through the top wall. The intermediate side walls may be at any desired angle to each other and to the vertical, but as here shown they are in substantially parallel planes separated widely enough apart to give the desired internal volume to the trap. In the specific form here shown all of the side walls except the inclined wall 24 are substantially upright; but this also is a condition which may be departed from within the scope of the general principles for which we claim protection. A baffle 28 is provided at the top of the trap chamber adjoining the top wall and between the side wall 24 and the vent 27. It is spaced apart from the wall 24 widely enough to give room for the stream of mercury and to deflect such stream, preventing the mercury from flowing or splashing into the vent. For this purpose it extends substantially across the entire distance between the intermediate side walls and adjoins the top wall closely enough to prevent free flow of mercury between itself and either of said walls. It is also inclined, whereby it is generally parallel to the wall 24, and it is further preferably curved with a reverse character of curvature to that of the upper part of wall 24, whereby to deflect the arrested and reversed stream downwardly and away from the vent. As a practical measure this baffle is preferably made as a wall or ledge integral with the top wall 17 and wide enough to fit closely between the intermediate side walls of the chamber, partitioning the pocket 26 from which the vent opens from the space provided to receive the stream of mercury, but leaving a sufficiently wide opening to the pocket for free escape of gas.

The volumetric content of the trap chamber is great enough to contain all the mercury provided in the indicator tube and chamber 13, or at least that volume of mercury which extends in the chamber 13 above the connection therefrom to the tube, whereby all of the mercury expelled from the manometer by an excessive pressure will be caught and retained in the trap, and the gas which follows the mercury through the tube will be allowed to escape until the excess pressure has been dissipated. The stream of mercury ejected from the manometer under these conditions is arrested by the top of the trap and reversed thereby and by the baffle and transformed into a quiet body occupying the trap, through which gas may flow until its pressure is exhausted. Such of the mercury as may be raised from this body by the violence of the gas stream is thrown into the space between the wall 24 and the baffle and is prevented from being blown through the vent. When the normal pressure conditions are restored the mercury flows automatically by gravity back into the manometer, thus restoring the manometer to its operating condition without need of replenishment of the mercury or other attention.

In the use of the apparatus of which the manometer is a part, shown in Fig. 1, it sometimes happens that a sluggish and viscous fluid in the tank, entering the submerged end of the pipe line 11, opposes so much resistance by friction and adhesion to being blown out from the pipe line as to require application of excessive pneumatic pressure to clear the line preliminary to establishing the balance between pneumatic pressure and fluid head necessary for the determination of depth measurements; and in order to permit as great an application of pneumatic pressure as may be necessary for this purpose, without loss of pressure through the vent after the mercury has been expelled from the manometer tube, we provide a branch pipe or line 29 of which one end is connected with the vent 27 and the other end with the pipe line 11 at any convenient point 30. A stop cock 31 having a vent to the atmosphere is inserted at any convenient point in the branch 29. This cock is so constructed of course that when set to open the branch 29 its vent is closed, and its vent may be opened when the cock is set to close the branch. Upon so opening the cock as great a pressure as may be needed can be developed because the vent from the trap is then connected with the pipe line 11; while upon closing the cock and opening its vent, the trap is vented to the atmosphere and the mercury column in the manometer relieved of back pressure, whereby it is enabled to indicate the actuating pressures with accuracy.

A modification for the same purpose is shown in Fig. 4 where the vent 27ª is governed by a loaded check valve 32 which remains open normally and permits escape of gas under moderate pressure, but is closed by rapid flow of gas under heavy pressure. For this purpose the valve has a wide head of considerably greater area than the vent orifice and supported when in fully opened position relatively near to the orifice, while it is loaded by a weight or equivalent means 33 so arranged as not to close the orifice. In the form here shown, the weight acts both as a stop limiting the opening of the valve and as the load for holding it open, being secured to the valve stem above the top wall and having a length greater and a width less than the dimensions of the vent orifice, as shown best in Fig. 5.

The principles underlying the invention as here described are not limited to use with an inclined manometer tube, since the trap will operate in the manner described when the tube is set in an upright position. In any case, however, the vent of the trap is at one side of the course of a stream flowing from the manometer tube, and any construction which embodies this characteristic is within the scope for which we claim protection for our invention.

What we claim and desire to secure by Letters Patent is:

1. The combination with a manometer tube having an open upper end, of a chamber in communication at its lower part with said tube and provided with a vent in its upper part, and a baffle interposed between said vent and the course of a stream flowing from the manometer tube into the chamber.

2. The combination with a manometer tube having an open upper end, of a chamber in communication at its lower part with said tube and provided with a vent in its upper part at one side of the prolonged line of said tube, and a baffle partition depending from the top wall of the chamber between such line and the vent.

3. The combination with a manometer tube having an open upper end, of a trap chamber having inclosed side and top walls and an inlet at a low point, and being mounted with its inlet in communication with the upper end of said tube; said chamber having an interior baffle arranged to define a pocket in the upper part of the chamber and an entrance to such pocket at one side of the course of a stream entering the chamber under pressure; and the pocket having a vent.

4. The combination with a manometer tube open at its upper end, of a trap secured to such upper end with its interior in communication with the interior of the tube, and having a vent from its upper part, said trap having an interior baffle disposed to deflect from the vent a stream of liquid entering the trap under pressure from the tube, and being further arranged to provide a passage to the vent at one side of the course of such a stream.

5. The combination with an open manometer tube, of an inclosed trap chamber having side and top walls and an inlet at a low point and being mounted with such inlet in register with the tube, a side wall of said chamber being substantially in continued alinement with the tube, and the top wall having a depending ledge or partition spaced away from said side wall.

6. The combination with an open manometer tube, of an inclosed trap chamber having side and top walls, and an inlet at a low point and being mounted with such inlet in register with the tube, a side wall of said chamber being substantially in continued alinement with the tube, and being curved in its upper part toward the top wall, and a ledge or partition depending from the top wall at the opposite side of the prolonged line of the tube from the aforesaid side wall.

7. The combination with an open manometer tube, of an inclosed trap chamber having side and top walls, and an inlet at a low point and being mounted with such inlet in register with the tube, a side wall of said chamber being substantially in continued alinement with the tube, and being curved in its upper part toward the top wall, and a ledge or partition depending from the top wall at the opposite side of the prolonged line of the tube from the aforesaid side wall, said top wall having also a vent for relief of pneumatic pressure at the opposite side of said ledge from that side wall.

8. The combination with an inclined open manometer tube of a trap having side and top walls inclosing a chamber of greater volumetric content than the bore of said tube, provided with a bottom inlet and mounted with said inlet in registering communication with the upper end of said tube, one side wall of the trap being inclined and in approximate continued alinement with the tube, the other side walls being substantially upright, a vent in the top wall out of line with the tube, and a baffle ledge depending from the top wall generally parallel to said inclined wall in a position between such wall and the vent.

9. The combination with an inclined open manometer tube of a trap having side and top walls inclosing a chamber of greater volumetric content than the bore of said tube, provided with a bottom inlet, and mounted with said inlet in registering communication with the upper end of said tube, one side wall of the trap being inclined and in approximate continued alinement with the tube, its upper part being curved toward the top wall, the other side walls being substantially upright, a vent in the top wall out of line with the tube, and a baffle ledge depending from the top wall generally parallel to said inclined wall making an obtuse angle with the top wall and curving toward the inclined side wall in a position between such wall and the vent.

10. A trap for connection with a manometer tube having an inlet passage, a wall extending along the prolonged line of such passage, an opposite wall diverging from the first named wall, a top wall forming with the last named wall a pocket, a vent issuing from said pocket, and a baffle between said pocket and the first named side wall.

11. A trap for connection with a manometer tube having an inlet passage, a wall extending along the prolonged line of such passage, an opposite wall diverging from the first named wall, a top wall forming with the last named wall a pocket, a vent issuing from said pocket, and a baffle between said pocket and the first named side wall, and means in association with said vent adapted to prevent loss of pneumatic pressure therethrough.

12. A mercury trap for connection with manometer tubes having an inlet passage, a vented gas pocket at one side of the line of said passage, and a baffle between such line and the pocket arranged to prevent passage of mercury from said line to the vent of the pocket.

13. A mercury trap for connection with a manometer tube, said trap having an inlet passage in its lower part, a vent for escape of gas in its upper part, and an interior baffle defining a gas pocket in that part of the trap from which said vent opens and providing an entrance to such pocket at one side of the course of a stream of liquid forcibly impelled into the chamber through said inlet, the baffle being also arranged to exclude flow of such stream to the vent.

14. A mercury trap for manometer tubes comprising a chamber having an inlet at a low point, a vent in the upper part at one side of the line of flow from said inlet, a baffle in the upper part between said line and said vent, and means for preventing outflow of gas through the vent.

15. The combination with a manometer having an indicating tube, and a pipe line, the manometer and pipe line being exposed to common pneumatic pressure, of a mercury trap connected to the upper end of the manometer tube and having a vent, and a valve adapted to arrest outflow of gas from the vent.

In testimony whereof we have hereunto affixed our signatures.

GARDNER CORNETT.
CECIL W. STANCLIFFE.